United States Patent [19]
Cleary et al.

[11] Patent Number: 5,504,905
[45] Date of Patent: Apr. 2, 1996

[54] APPARATUS FOR COMMUNICATING A CHANGE IN SYSTEM CONFIGURATION IN AN INFORMATION HANDLING NETWORK

[75] Inventors: James W. Cleary, Coral Springs; Carolyn L. Lay, Boca Raton; Mitchell E. Medford; Michael R. Primm, both of Delray Beach, all of Fla.; Frederick C. Stanley, Massapequa, N.Y.

[73] Assignee: International Business Machines Corporation, Armonk, N.Y.

[21] Appl. No.: 245,287

[22] Filed: May 17, 1994

[51] Int. Cl.⁶ .................................................. G06F 9/00
[52] U.S. Cl. ................... 395/700; 364/DIG. 1; 364/280; 364/280.2; 364/280.9
[58] Field of Search ....................... 395/700, 650

[56] References Cited

U.S. PATENT DOCUMENTS

| | | |
|---|---|---|
| 5,237,689 | 8/1993 | Behnke ................................. 395/700 |
| 5,237,690 | 8/1993 | Bealkowski et al. .................. 395/700 |
| 5,307,465 | 4/1994 | Iki .......................................... 395/325 |
| 5,379,431 | 1/1995 | Lemon et al. ......................... 395/700 |
| 5,390,303 | 2/1995 | Iki .......................................... 395/325 |

*Primary Examiner*—Kevin A. Kriess
*Attorney, Agent, or Firm*—R. S. Babayi

[57] ABSTRACT

An information handling network includes a plurality of information processing systems having a pretermit system configuration operating under the control of a corresponding number of operating systems where during a initial microcode load (IML) period prior to loading the operating systems a change in the system configuration is detected based on the predetermined system configuration. Upon detecting the change, a communication adaptor device is activated for communicating certain configuration information over the network before loading the operating system.

10 Claims, 13 Drawing Sheets

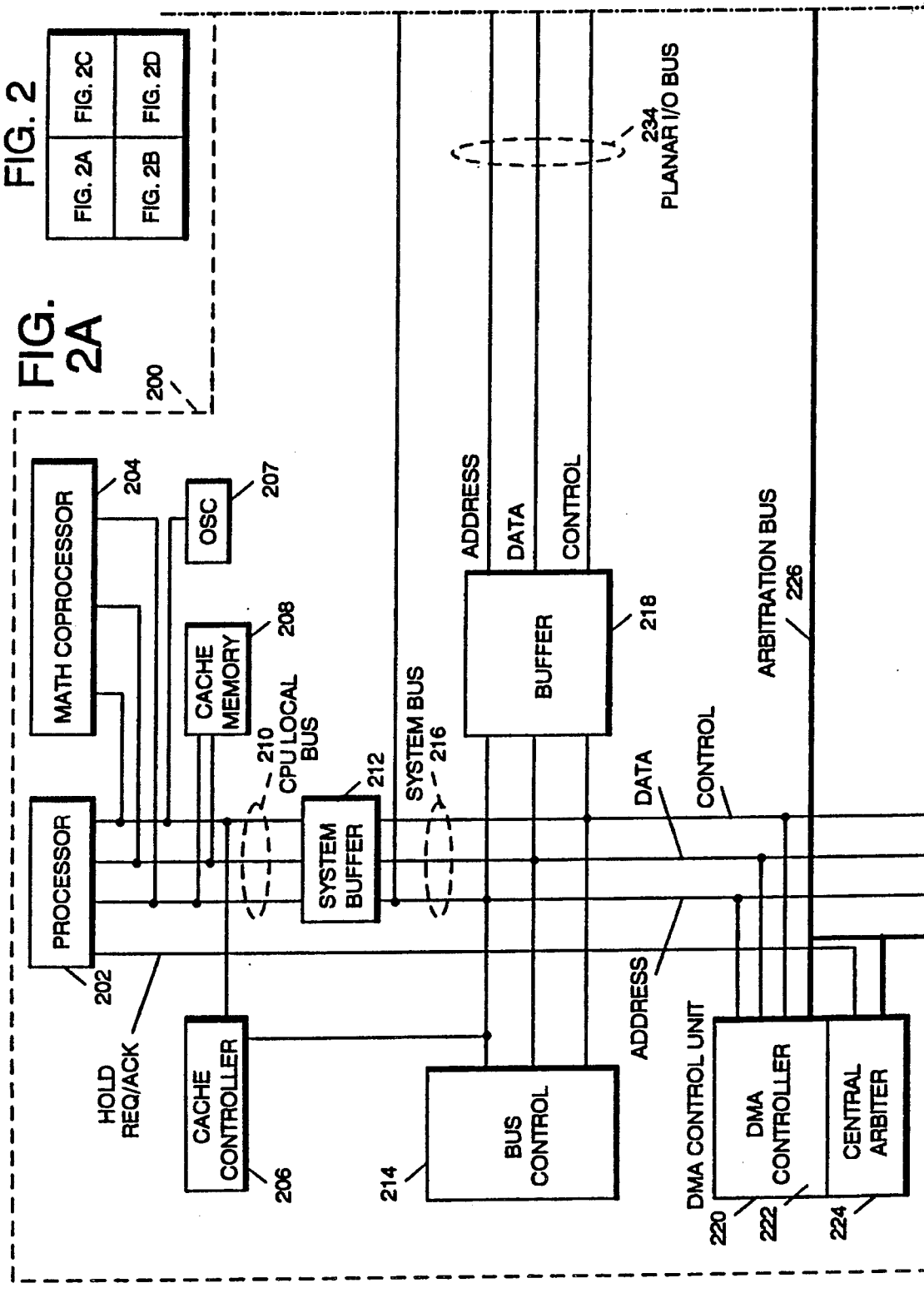

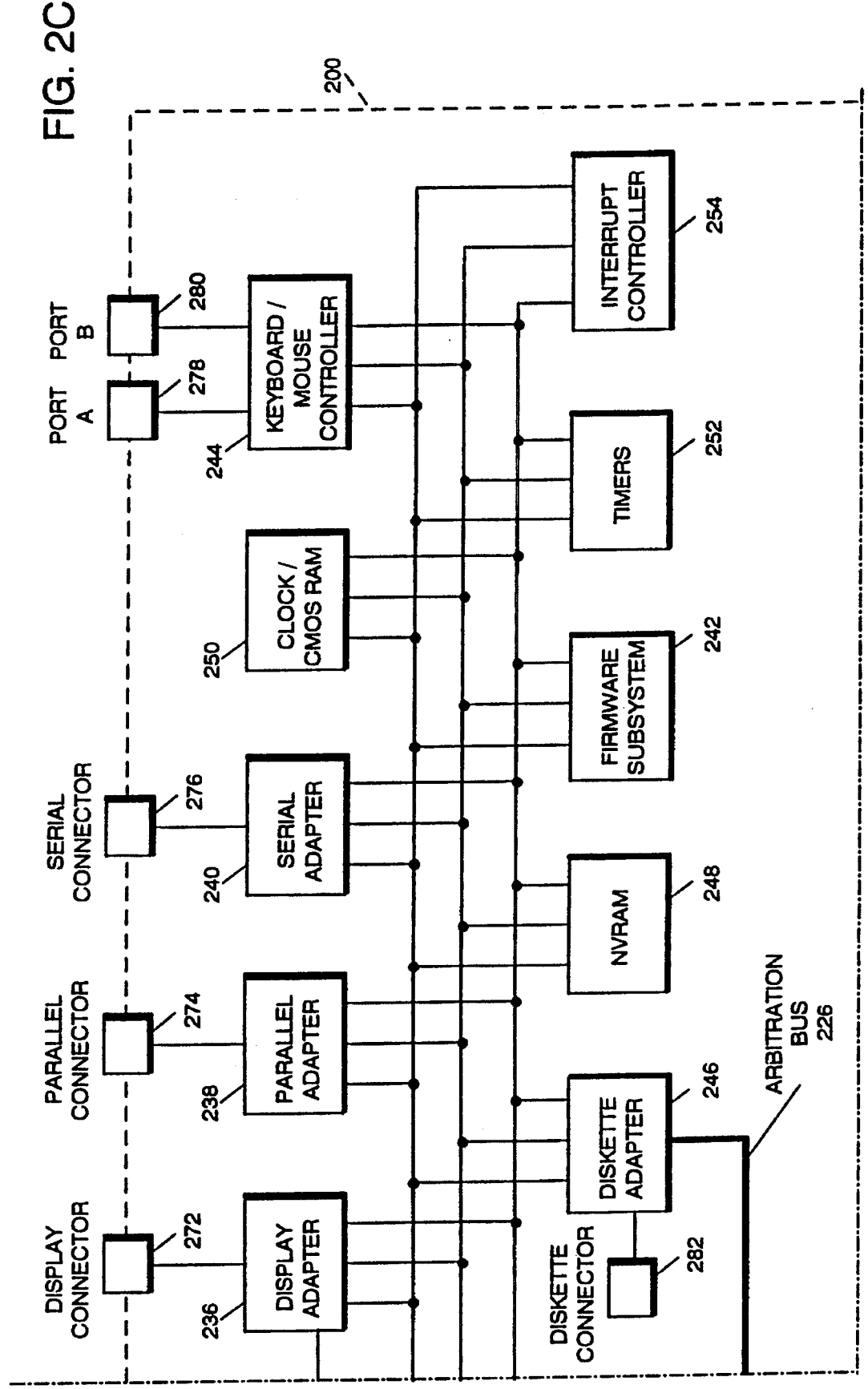

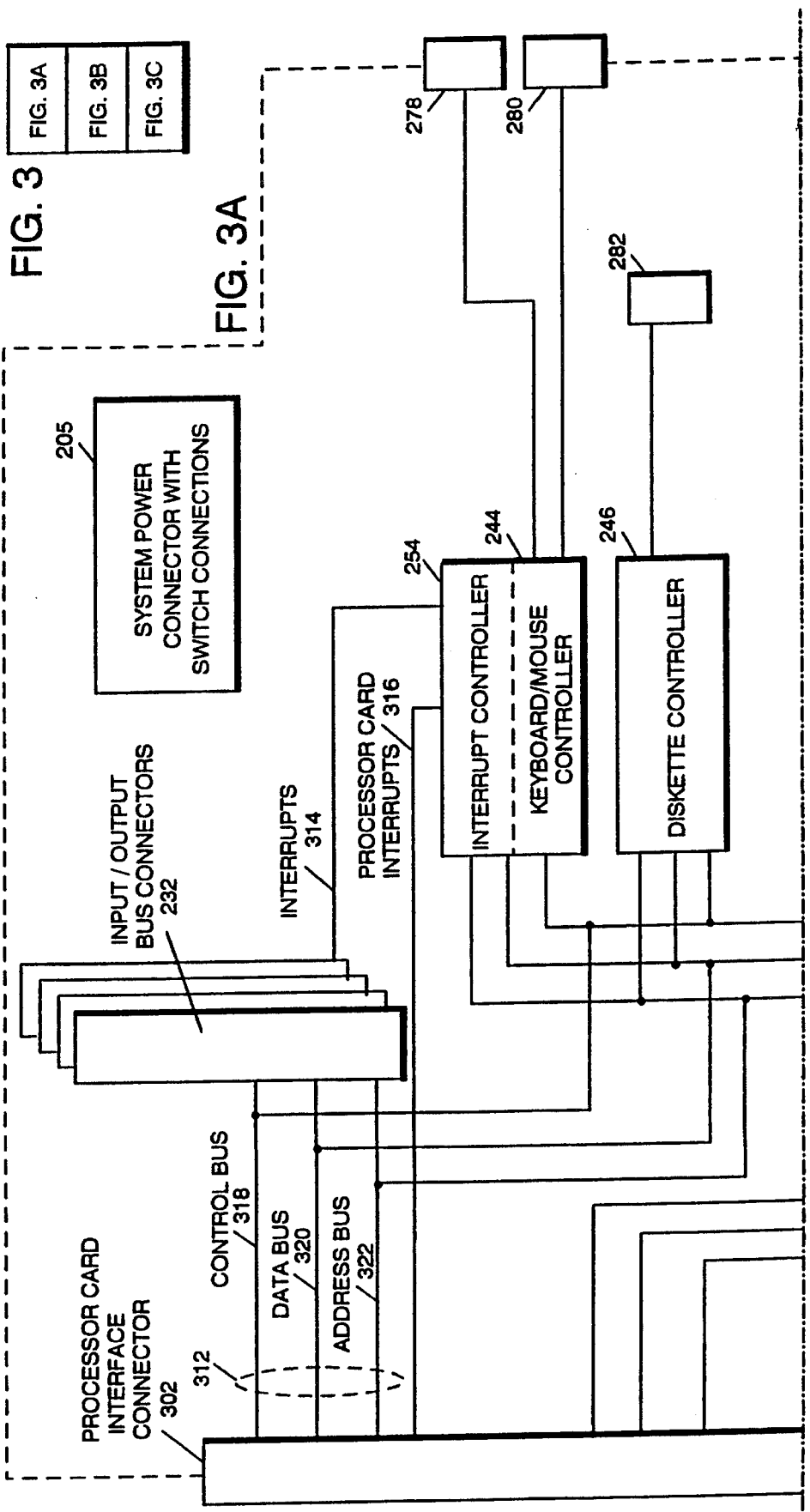

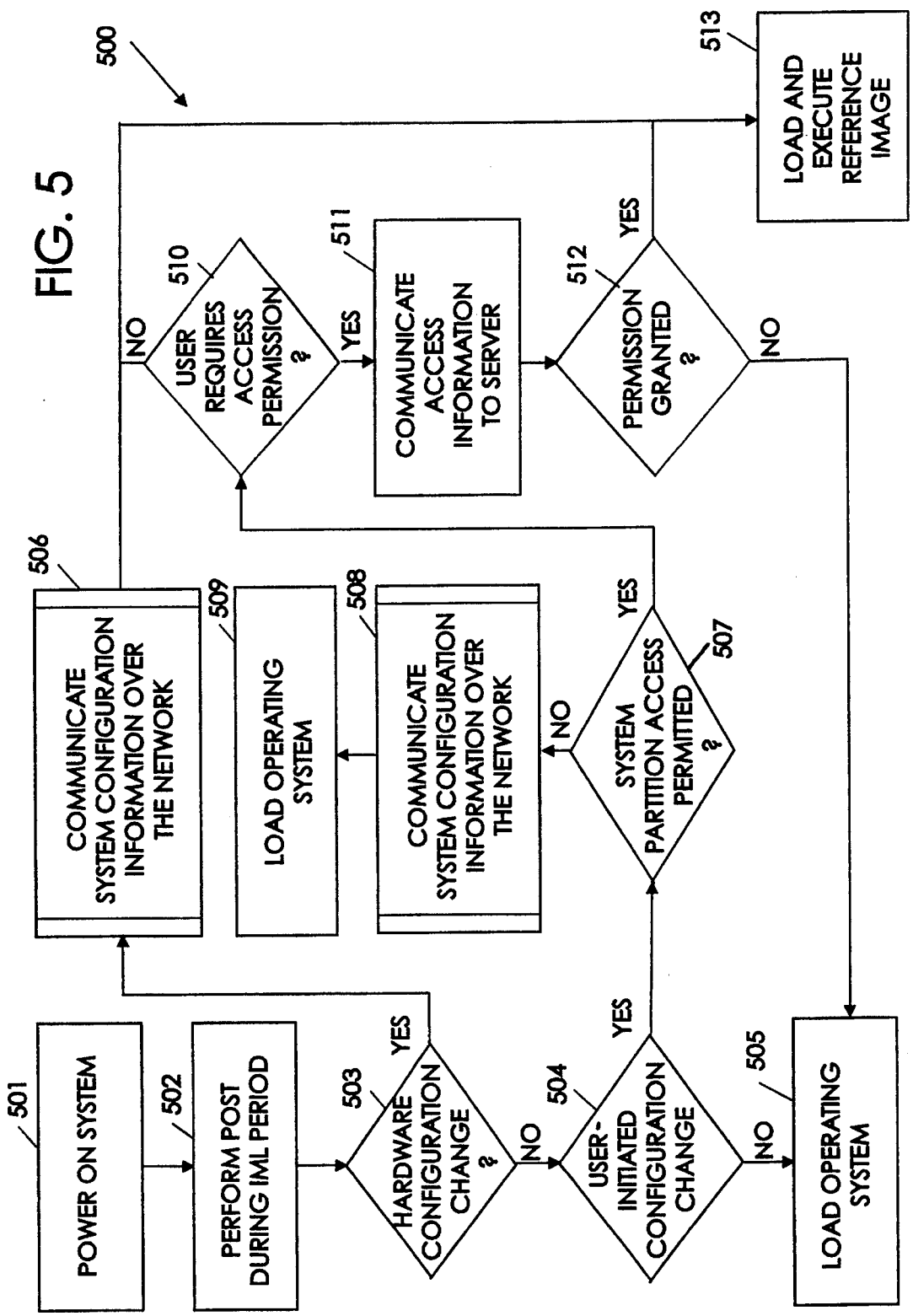

APPARATUS FOR COMMUNICATING A CHANGE IN SYSTEM CONFIGURATION IN AN INFORMATION HANDLING NETWORK

FIELD OF THE INVENTION

This invention relates to an information handling network having a plurality of networked information processing systems and, more particularly, to a method and apparatus for communicating system configuration information among the information processing systems of the network.

BACKGROUND OF THE INVENTION

Personal computer systems in general, and IBM personal computers in particular, have attained widespread use for providing computer power to many segments of today's society. A personal computer system can usually be defined as a desk top, floor standing, or portable computer that includes a system unit having a system processor, a display monitor, a keyboard, one or more diskette drives, a fixed disk storage, an optional pointing device such as a "mouse," and an optional printer. These systems are designed primarily to give independent computing power to a single user or small group of users and are inexpensively priced for purchase by individuals or businesses. Examples of such personal computer systems are sold under the trademarks: IBM's PERSONAL COMPUTER, PERSONAL COMPUTER XT, PERSONAL COMPUTER AT and IBM's PERSONAL SYSTEM/2 (hereinafter referred to as the IBM PC, XT, AT, and PS/2, respectively) Models 25, 30, 50, 55, 57, 60, 65, 70, 80, 90 and 95.

These systems can be classified into two general families. The first family, usually referred to as Family 1 Models, uses a bus architecture exemplified by the AT computer and other "IBM compatible" machines. The second family, referred to as Family 2 Models, uses IBM's MICRO CHANNEL bus architecture exemplified by IBM's PS/2 Models 50 through 95. The bus architectures used in Family 1 and Family 2 models are well known in the art.

The IBM PC and XT were the first models of the IBM personal computer line and used the Intel 8088 processor. The next significant change to IBM personal computer systems was the AT which used the Intel 80286 processor. The PS/2 line spanned several of the Intel processors. A system similar to the IBM PC and XT was a version of the PS/2 Model 30 which used an Intel 8086 processor. The PS/2 Models 50 and 60 both used the Intel 80286 processors. The Intel 80386 processor is used in the IBM PS/2 Model 80 and certain versions of the IBM PS/2 Model 70. Other versions of the IBM PS/2 Model 70, as well as the PS/2 Models 90 XP 486 and 95 XP 486, use the Intel 80486 processor. One of the common points in all these systems is the use of an Intel 86 Family processor. A variety of commonly available and well known software operating systems, such as a DOS or an OS/2 operating system, can operate on various members of the Intel 86 Family of processors.

Beginning also with the earliest personal computer system of the Family 1 models, such as the IBM PC, it was recognized that a goal of achieving software-hardware compatibility would be of great importance. In order to achieve this goal, an insulation layer of system resident code, also referred to as "microcode," was established between the hardware and the software. This code provided an operational interface between a user's application program/operating system and the hardware device to relieve the user of the concern about the characteristics of hardware devices. Eventually, the code developed into a basic input/output system (BIOS), for allowing new hardware devices to be added to the system, while insulating the application program/operating system from the peculiarities of the hardware devices. The importance of BIOS was immediately evident because it freed a device driver from depending on specific hardware device characteristics while providing the device driver with an intermediate interface to the hardware device. Because BIOS was an integral part of the computer system and controlled the movement of data in and out of the system processor, it was resident on a system planar board of the system unit and was shipped to the user in either a read-only memory (ROM) or an erasable programmable read-only memory (EPROM). For example, BIOS in the original IBM PC occupied 8K bytes (a kilobyte or "K byte" refers to a quantity of 1024 bytes) of ROM resident on the planar board. In addition to the ROM, the planar board included the system processor, a main random access memory (RAM), and other components which were fixed in a substantially coplanar relationship on the board. The ROM also contained a power-on self test (POST) program which was used to test and initialize the computer system. The accumulation of code resident in the computer system ROM became known as the "system firmware," or simply "firmware." Thus, the firmware included a POST portion and a BIOS portion. Sometimes, BIOS was defined to include the POST program.

As new models of the personal computer family were introduced, the firmware had to be updated and expanded to support new hardware devices such as input/output (I/O) devices. As could be expected, the firmware started to increase in memory size. For example, with the introduction of the IBM PERSONAL COMPUTER AT, the firmware grew to require 32K bytes of ROM. With the introduction of the IBM PERSONAL SYSTEM/2 computer system with MICRO CHANNEL architecture, a significantly new BIOS, known as Advanced BIOS, or ABIOS, was developed. However, to maintain software compatibility, BIOS from the Family 1 models had to be included in the Family 2 models. The Family 1 BIOS became known as Compatibility BIOS or CBIOS. Thus, BIOS evolved to include more than one type of BIOS such as the Compatibility Basic Input Output System (CBIOS) and the Advanced Basic Input Output System (ABIOS). Present architectural definitions for personal computer systems allow for up to 128K bytes of system address space for firmware (system firmware address space).

Today, with the continuing development of new technology, personal computer systems are becoming more sophisticated and are being enhanced more frequently. Because the technology is changing rapidly and new I/O devices are being added to the personal computer systems, effecting modifications and extensions to the firmware have become significant problems in the development cycle of personal computer systems.

With introduction of MICRO CHANNEL architecture, IBM offered a new configuration procedure known as Programmable Option Select (POS). POS is designed to make installation and expansion of system enhancements much easier and less confusing than in previous PCs by eliminating the need for configuring a system using DIP switches, jumpers and headers. Using low power, battery packed CMOS memory PS/2 systems can remember their hardware configuration. The configuration includes the identity of expansion devices and how the expansion devices function in relation to the rest of the system. Every expansion card designed for Micro-Channel has a unique identifying number. When the system boots up, the PS/2 system compares the installed options with the information in its non-volatile memory to detect changes to insure the integrity of its setup. The setup files are automatically incorporated into the file system during configuration procedure using a Reference Diskette. In some IBM PS/2 models, such as the models 70 and 80, the reference diskette comprises a floppy diskette which accompanies the computer system and stores the system configuration information. Although, the configuration procedure of the PS/2 systems is fairly simple, and easy to perform, the reference diskette must be handy or conveniently stored nearby. It is however, possible to lose or misplace the reference diskette after some period of time from the last system configuration. Therefore, it became desirable to store a copy of reference diskette on the DASD.

In the U.S. Pat. No. 5,128,995 issued to Arnold et al. and assigned to the assignee of the present application and which is hereby incorporated by reference, an apparatus for loading a system reference diskette image from a system portion of a DASD is disclosed in which the DASD has a protected region for storing a boot record, a BIOS image and a system reference diskette. The reason for protecting a portion of DASD arises from the need to prevent contamination and corruption of BIOS. During certain system operation, such as when the processor is under the control of the operating system or when it is running an application, the DASD controller is configured to ignore the protected region.

Increasingly, personal computer systems are linked together to provide an information handling network (e.g., a Local Area Network or LAN) so that a plurality of information processing systems can exchange information, share I/O devices, and utilize a particular direct access storage device (DASD), such as a particular hardfile or diskette. Typically, the information network includes a number of information processing systems known as "clients" and at least one administrator processing system known as "server" all of which are connected or networked with each other via a communication medium, such as copper wire and/or fiber optic cables. Typically, network communications by subsystem components (i.e., client systems or server system) are handled via communication adapter devices which are compliant with one or more network communication protocols, such as Token Ring or Ethernet.

Obviously, the primary advantages of a networked information handling system is its ability to provide for communication of various types of information among a plurality of information processing systems. Among the information that may be communicated within the network is information relating to status an/or configuration of the system itself. The configuration information may be processed in various fashions, for example, to perform diagnostics or to inform other networked information processing systems of each others configuration and capabilities.

Conventionally, the system configuration information has been utilized to detect faulty conditions within large networked systems. For example, IBM's system 390 is designed to monitor performance within a networked system in real time. Upon detection of a faulty condition, a diagnostic routine is performed to isolate the faulty condition to a defective system component. Thereafter, information relating to the detected faulty condition and the diagnosis result are communicated to a central station via a modem on a telephone line.

The real time fault monitoring and fault communication capability of prior art systems are generally incorporated within the system hardware architecture and/or within the operating system or an application software. Unfortunately, the real time fault detection as implemented in the large computer system networks is not suitable for smaller information handling systems, such as those comprising personal computers. This is partly because the existing defacto standard operating systems, such as DOS and WINDOWS, do not support fault analysis and reporting capability which is available in the larger systems. More importantly, the present central processing power of personal computer systems makes real time configuration monitoring, fault detection and reporting impractical.

However, there still remains a need for communicating system related information over an information handling network which comprises small information processing systems, such as personal computers, whose operating systems and CPU power does not support communication of system configuration information in real time over the network.

The present inventors are aware of other arrangements for storing, loading and initializing IML images. See, for example, commonly owned: U.S. Pat. No. 5,210,875, entitled "Initial BIOS Load for a Personal Computer System," U.S. patent application Ser. No. 07/777,844, entitled "Programmable Firmware Store for a Personal Computer System," and U.S. patent application Ser. No. 07/799,486, entitled "Automated Programmable Firmware Store for a Personal Computer System," which are all incorporated herein by reference.

SUMMARY OF THE INVENTION

Briefly, according to the invention, in an information handling network comprising a plurality of information processing systems operating under control of a corresponding number of operating systems, each information processing system has a predetermined system configuration. The processing system includes detection means for detecting a change in the system configuration based on the predetermined system configuration during an initial microcode load (IML) period prior to loading the operating system. The processing system also includes communication means for communicating the system configuration information over the network upon detecting the change in the system configuration prior to loading the operating system.

The information handling network may further includes an administrator information processing system which has monitoring mean for monitoring communication over the network and receiver means for receiving the system configuration information as communicated over the network.

The system configuration information may comprise identification for an information processing system where the change in the system configuration is user activated. The administrator information processing system includes means to providing an authorization signal allowing or disallowing the user initiated system configuration change.

BRIEF DESCRIPTION OF THE DRAWING

Further and still other objects of the present invention will become more readily apparent in light of the following description when taken in conjunction with the accompanying drawing, in which:

FIG. 5 is a flow diagram of steps taken for communicating system configuration information over the information handling network of FIG. 1B according to the present invention.

DETAILED DESCRIPTION OF A PREFERRED EMBODIMENT

The following detailed description is of the best presently contemplated mode for carrying out the present invention. This description is not to be taken in a limiting sense, but is made for the purpose of illustrating the general principles of the invention.

Figure 1A:
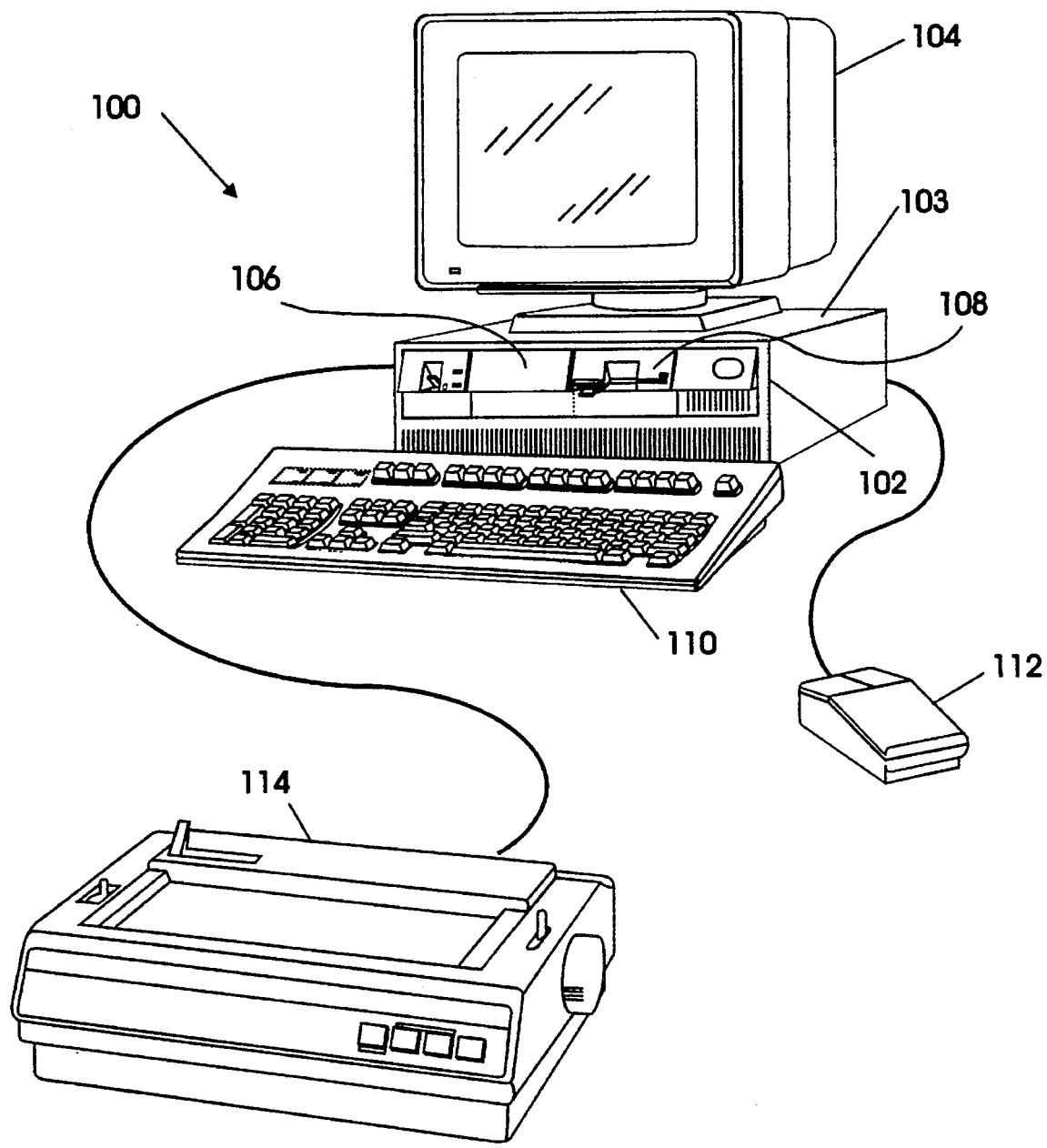
FIG. 1A is a perspective view of a typical personal computer system.

Referring now to the figures, and in particular to FIG. 1A, there is shown a personal computer system 100 which is capable of operating within the information handling network 150 of the present invention. The personal computer system 100 comprises a system unit 102 having a suitable enclosure or casing 103, output device or monitor 104 (such as a conventional video display), input devices such as a keyboard 110, an optional mouse 112, and an optional output device such as a printer 114. Finally, the system unit 102 may include one or more mass storage devices such as a diskette drive 108 (operable with a diskette—not shown) and a direct access storage device (DASD) 106, also known as hard file.

Figure 1B:
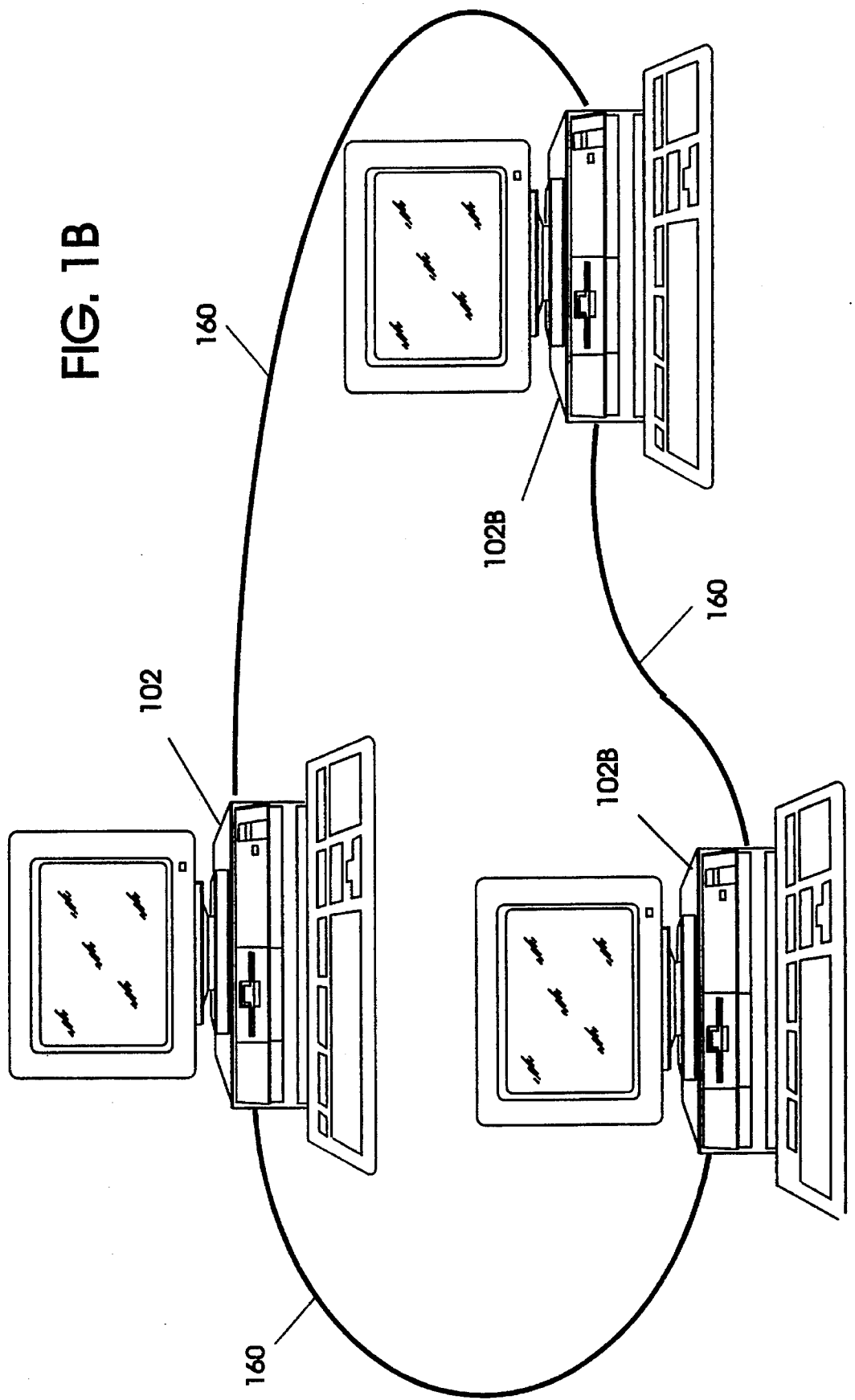
FIG. 1B is a diagram of an information handling network embodying the apparatus and method according to the present invention.

Referring to FIG. 1B, an information handling network 150 is shown. The information handling network 150 comprises a plurality of information processing systems 102 and 102B one or more of which may be identical to the personal computer system 100 of FIG. 1A. The processing system 102 is a server which acts as an administrator processing system within the information handling network 150. The processing systems 102B comprise client systems. Typically, The client systems (102B) are identical to the unit 102, except that systems 102B may include no DASD 106 in which case these systems (102B) are referred to as "media-less clients." The information processing systems (102 and 102B) are networked with each other in a well known manner and communicate information signals over the information handling network 150 via cables 160.

In operation, the information processing systems 102 and 102B functions under the control of an operating system, such as IBM's OS/2 operating system or DOS operating system which are suitably loaded after an initial micro load (IML) period. The operating system typically utilizes BIOS which is loaded into the system memory during the IML period. BIOS provides an interface between the hardware devices and the operating system software to enable a programmer or user to program his machine without an in-depth operating knowledge of a particular hardware device. For example, a BIOS diskette module permits a programmer to program the diskette drive without an in-depth knowledge of the diskette drive hardware. Thus, a number of diskette drives designed and manufactured by different companies can be used within the system 100. Also, loaded during the IML period is POST program which performs a self test of the system hardware upon power on to determine system configuration. POST stores the system configuration in an storage device, such as an NVRAM. As such, POST may detect a system configuration change by comparing predetermined system configuration to the current system configuration. BIOS an POST more clearly defined in the *IBM Personal System/2 and Personal Computer BIOS Interface Technical Reference* 1991, which is hereby incorporated by reference herein.

Unified Planar

Figure 2B:
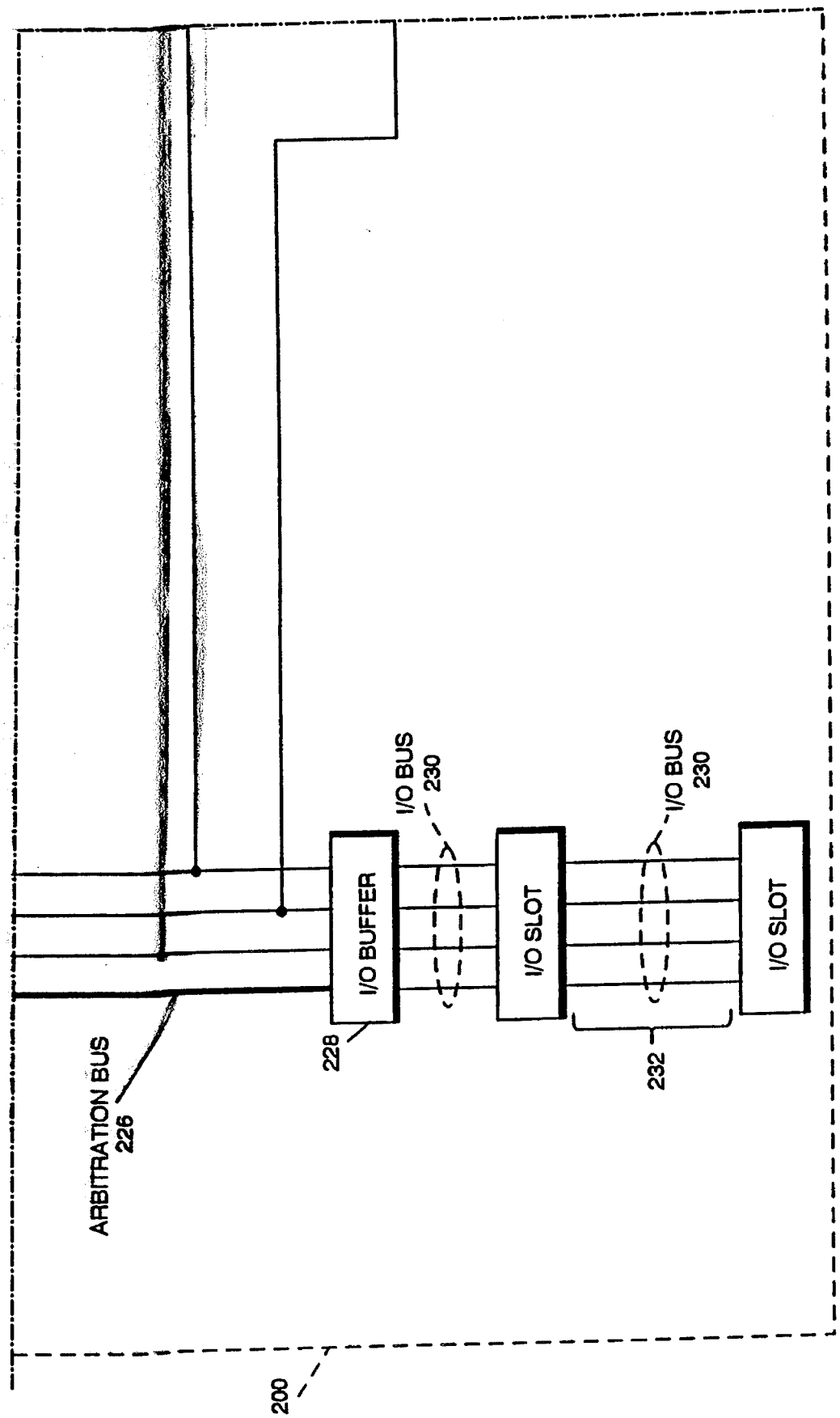
FIG. 2 is a block schematic diagram of a unified planar board for the computer system of FIG. 1A.
Figure 2D:
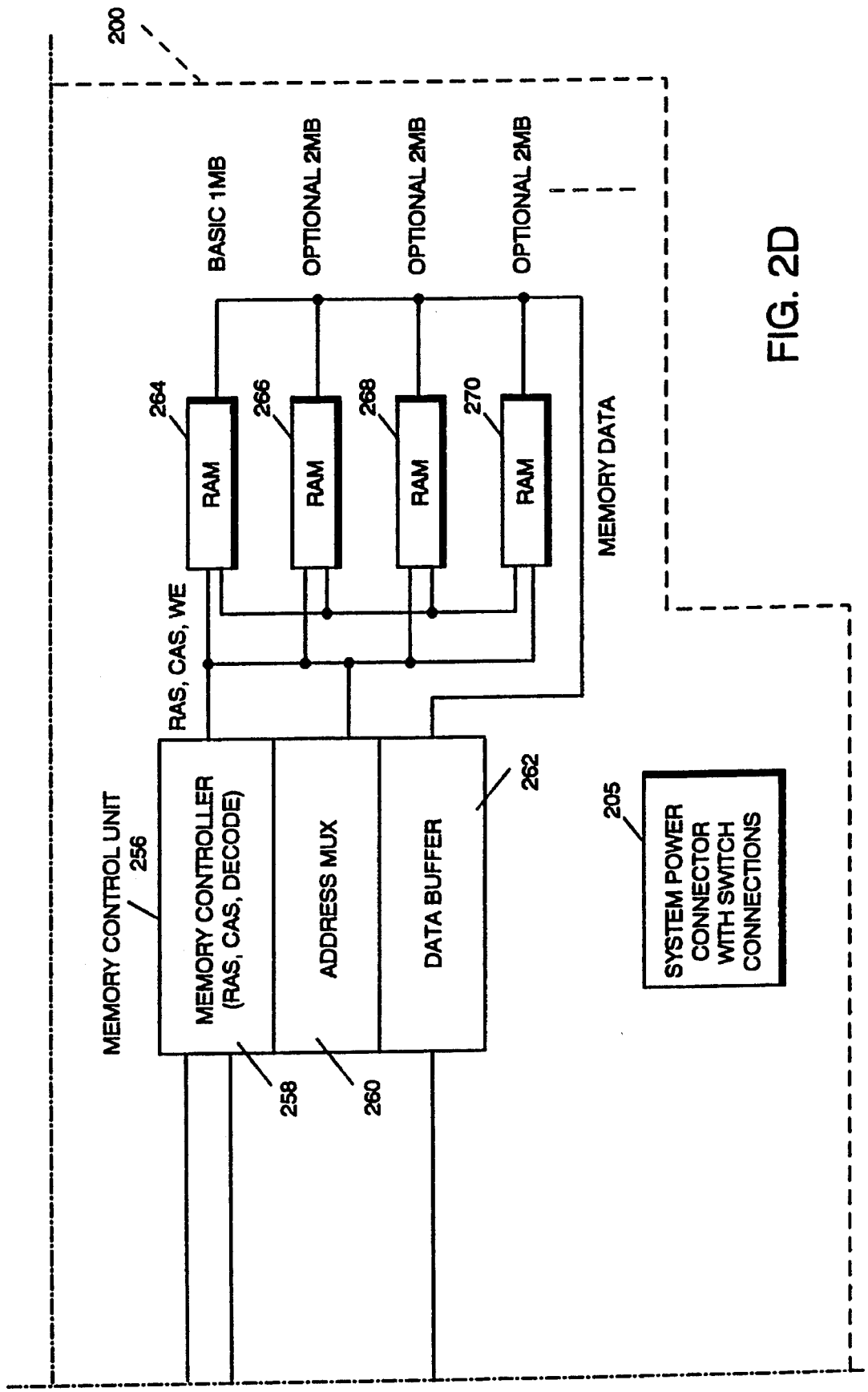

Referring to FIG. 2, there is shown a block diagram of a unified planar 200 of the information processing system 102 or 102B. The planar 200 includes a printed circuit board (PCB) 201 upon which are mounted or connected a number of input/output bus connectors 232 having I/O slots, a processor 202 which is connected by a high speed CPU local bus 210 under control of a bus control unit 214 to a memory control unit 256. The unit 256 is further connected to a main memory such as volatile random access memory (RAM) 264. Any appropriate processor 202 can be used such as an Intel 80386, Intel 80486 or the like. A system power connector 205 is mounted on the PCB 201 for connection to a power unit (not shown) that supplies the necessary power for the system 100.

The CPU local bus 210 (comprising address, data and control components) provides for the interconnection of the processor 202, an optional math coprocessor 204, an optional cache controller 206, and an optional cache memory 208. Also coupled onto the CPU local bus 210 is a system buffer 212. The system buffer 212 is itself connected to a system bus 216 which comprises address, data and control components. The system bus 216 extends between the system buffer 212 and an I/O buffer 228. The system bus 216 is further connected to the bus control unit 214 and to a direct memory access (DMA) control unit 220. The DMA control unit 220 includes a central arbiter 224 and a DMA controller 222. The I/O buffer 228 provides an interface between the system bus 216 and an I/O bus 230. An oscillator 207 is connected as shown for providing suitable clock signals to the computer system 100. Those skilled in the art will recognize that while the preferred embodiment is implemented on the MICRO CHANNEL bus of an IBM PS/2 computer system, which is well known in the art, alternative bus architectures could also be used to employ the invention.

Connected to the I/O bus 230 is a plurality of I/O bus connectors having slots 232 for receiving adapter cards which may be further connected to I/O devices or memory. Two I/O connectors 232 are shown for convenience, but additional I/O connectors may easily be added to suit the needs of a particular system. As shown, one of the I/O connectors is connected to a well known Token Ring communication adaptor card 231 which is used to provide network communication capability for the information processing system (102 or 102B). Upon start of a network communication, the CPU 202 activates the Token Ring adapter card 231 in a well known manner to allow inbound or outbound information to be communicated over the information handling network 150. As such, the communication adapter card 231 includes both transmitter means and receiver means for communicating information over the network 150. An arbitration bus 226 couples the DMA controller 222 and the central arbiter 224 to the I/O connectors 232 and a diskette adapter 246. Also connected to the system bus 216 is the memory control unit 256 which includes a memory controller 258, an address multiplexer 260, and a data buffer 262. The memory control unit 256 is further connected to the main memory such as the random access memory as represented by the RAM module 264. The memory control unit 256 includes logic for mapping addresses to and from the processor 202 to and from particular areas of the RAM 264. While the system 100 is shown with a basic one megabyte RAM module 264, it is understood that additional memory can be interconnected as represented in FIG. 2 by optional memory modules 266, 268, 270.

A buffer 218 is coupled between the system bus 216 and a planar I/O bus 234. The planar I/O bus 234 includes address, data, and control components. Coupled along the planar I/O bus 234 are a variety of I/O adapters and other peripheral components such as a display adapter 236 (which is used to drive the optional display 104), a clock/CMOS RAM 250, a nonvolatile RAM 248 (hereinafter referred to as NVRAM), a serial adapter 240 (other common terms used for "serial" are "synchronous" and "RS232"), a parallel adapter 238, a plurality of timers 252, the diskette adapter 246, a keyboard/mouse controller 244, an interrupt controller 254, and a firmware subsystem 242. The firmware subsystem 242 typically includes a nonvolatile program store (e.g., ROM) which contains a portion of POST and BIOS programs known as stage I POST. As described later in detail, stage I POST is used for an initial and limited system testing an includes routines for loading a stage II POST which is also known as initial micro load (IML) image from an external storage device, such as the floppy drive 108 or the hardfile 106.

The clock/CMOS RAM 250 is used for time of day calculations. The NVRAM 248 is used to store system configuration. That is, the NVRAM 248 will contain values which describe the present configuration of the system 100. The NVRAM 248 contains information which describes, for example, adapter card initialization data, capacity of a fixed disk or a diskette, the amount of main memory, etc. Furthermore, these data are stored in NVRAM 248 whenever a configuration program is executed. This configuration program can be a conventional Set Configuration program provided on a system Reference Diskette included with IBM PS/2 computer systems. The Reference Diskette is sometimes referred to as a diagnostic, maintenance or service diskette. The purpose of the configuration program is to predetermine and pre-store values characterizing the configuration of this system 100 to NVRAM 248 which are saved when power is removed from the system. The NVRAM can be a low power CMOS memory with a battery backup.

Connected to the keyboard/mouse controller 244 are a port A 278 and a port B 280. These ports A,B are used to connect the keyboard 110 and the mouse 112 to the personal computer system 100. Coupled to the serial adapter 240 is a serial connector 276. An optional device such as a modem (not shown) can be coupled to the system through this connector 276. Coupled to the parallel adapter 238 is a parallel connector 274 to which a device such as the printer 114 can be connected. Connected to the diskette adapter 246 is a diskette connector 282 used to attach one or more diskette drives 108.

Alternate Planar Board

Figure 3B:
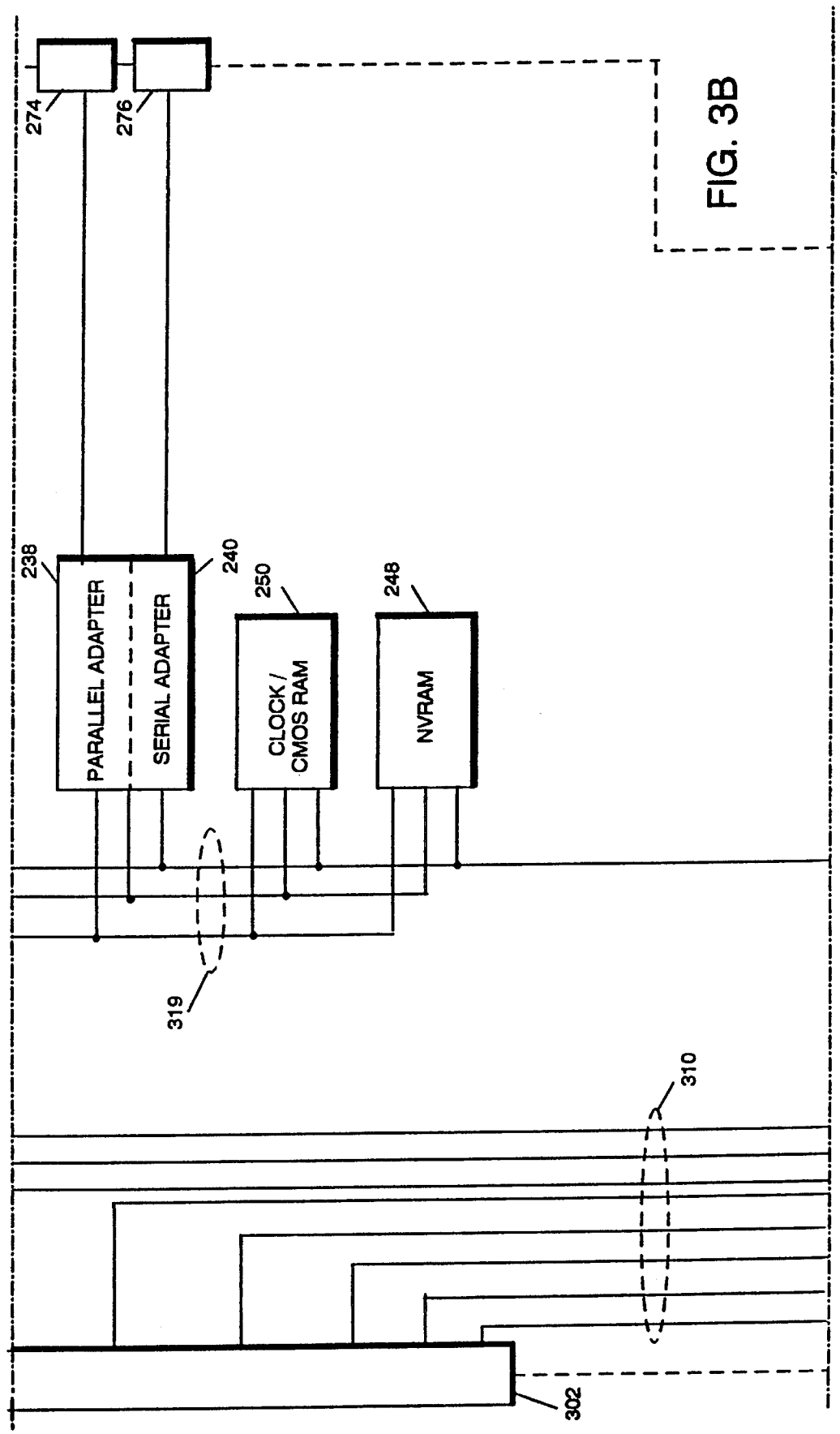
FIG. 3 is a block schematic diagram of an alternative planar board for the computer system of FIG. 1A.
Figure 3C:
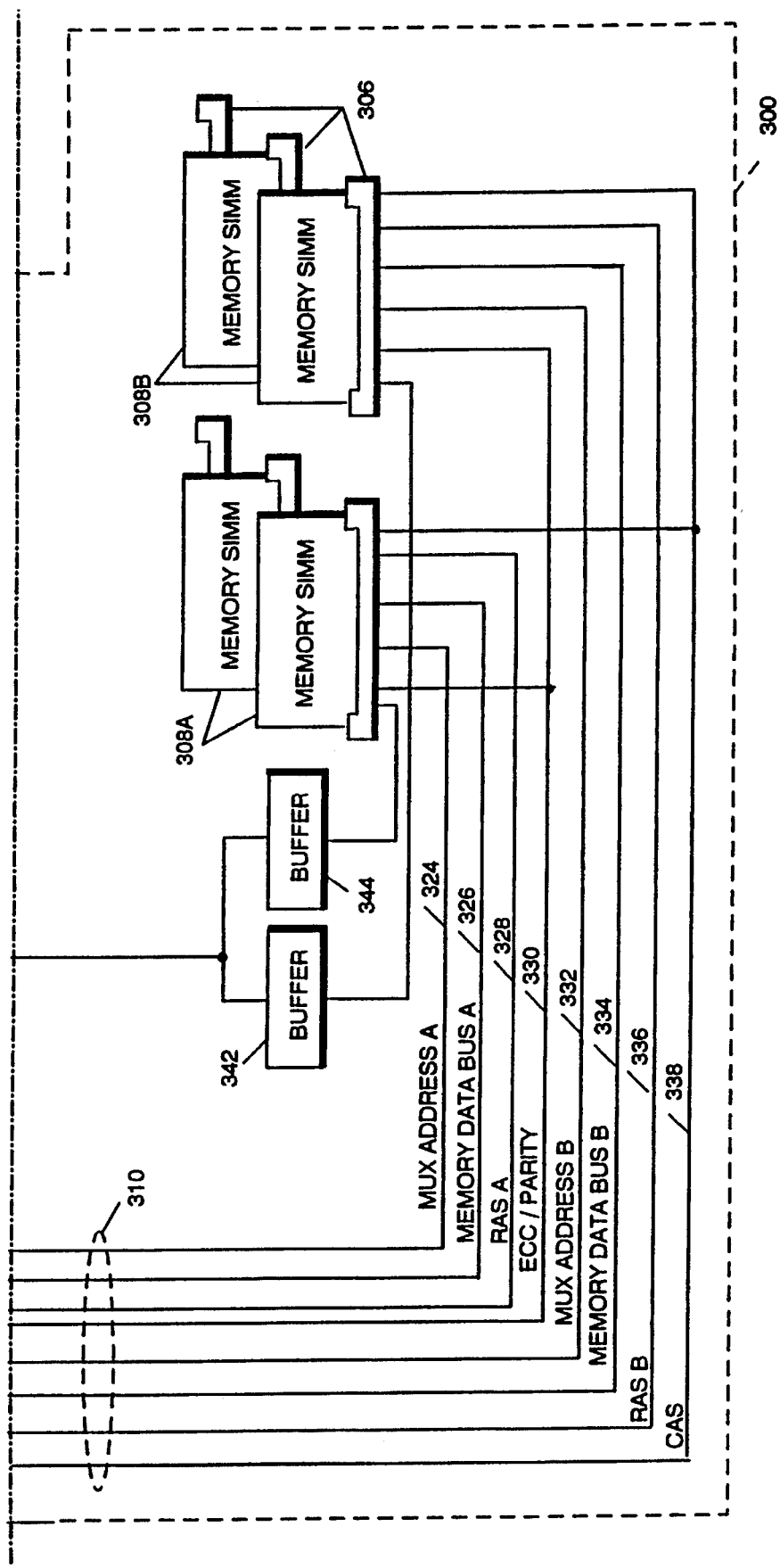
Figure 4A:
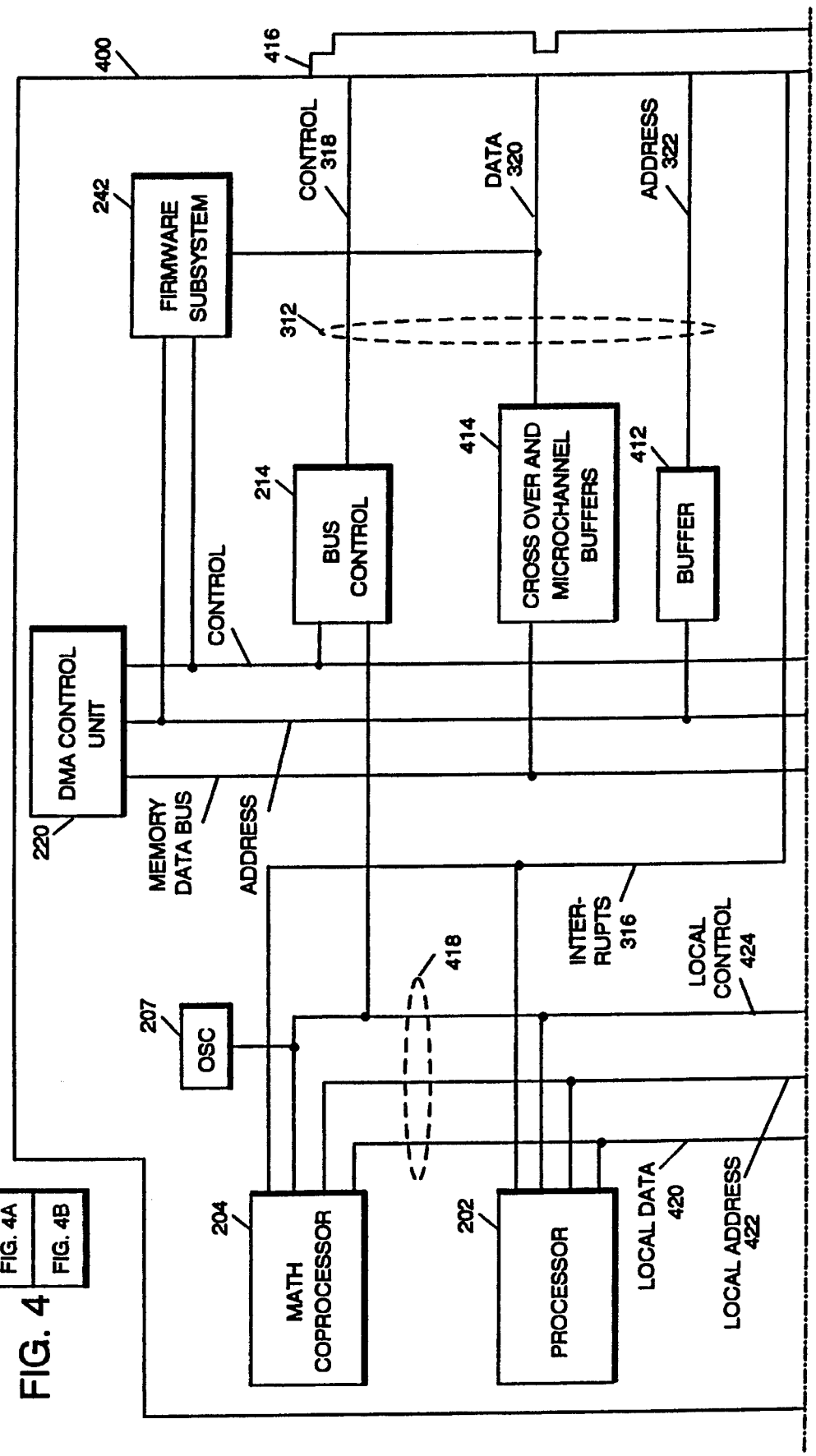
FIG. 4 is a block schematic diagram of a processor card for use with the alternative planar board of FIG. 3.
Figure 4B:
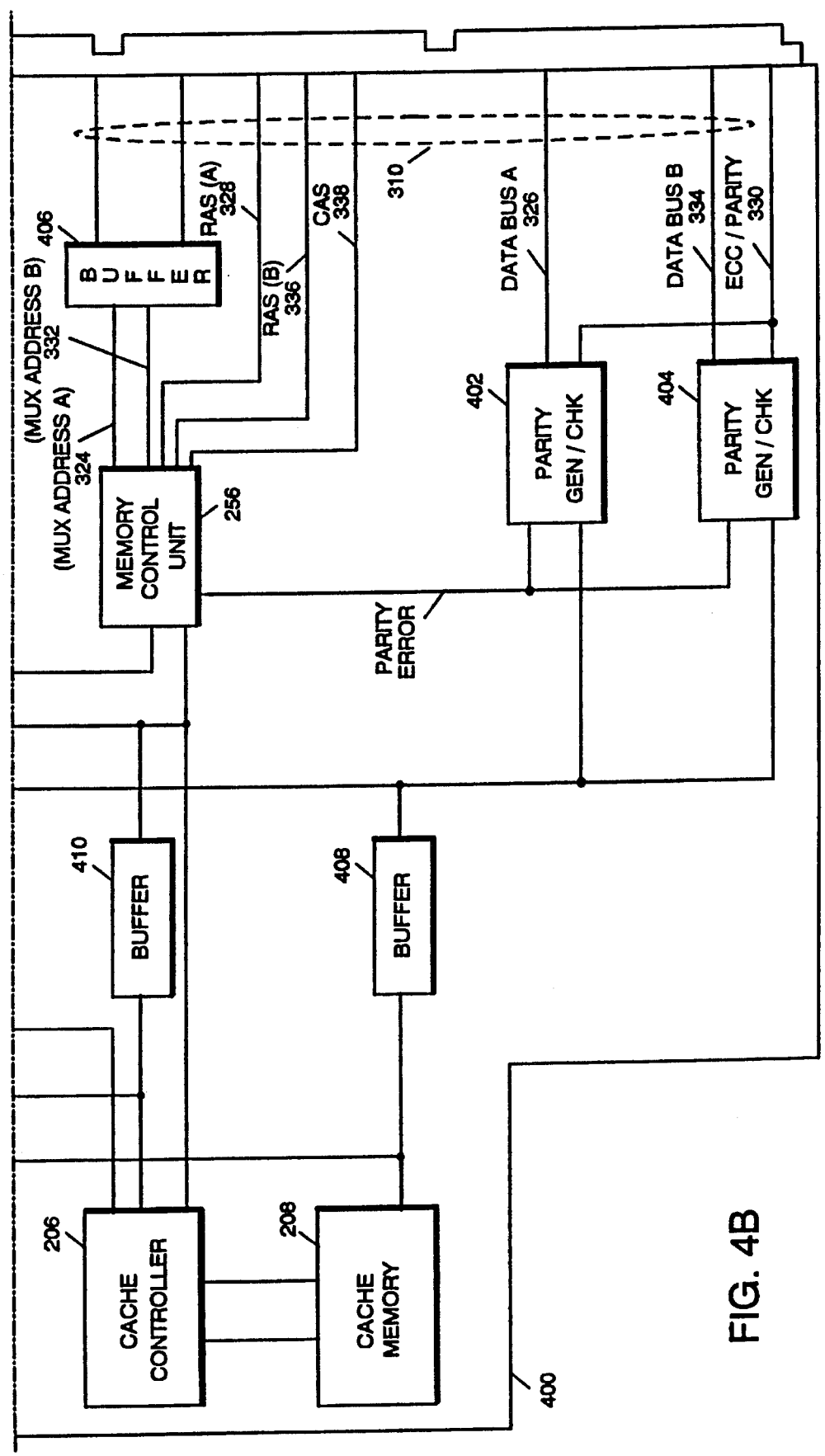

According to an alternative embodiment of the personal computer system 100, the unified planar 200 is replaced by a planar board 300 and a processor card 400 (FIGS. 3 and 4). The processor card 400 is removably mounted on and is electrically connected to the planar board 300. Identical element numbers of FIG. 2 correspond to identical elements in FIGS. 3 and 4. Referring now to FIG. 3, the planar board 300 comprises a printed circuit board (PCB) 301 upon which are mounted (e.g., surface mounted) various components that are interconnected by wiring or circuits in the PCB. Such components include a suitable commercially available electrical connector 302 into which an edge 416 of the processor card 400 is plugged for removably mounting and electrically connecting the processor card 400 to the planar board 300. A plurality of single in-line memory module (SIAM) connectors 306 is also mounted on the PCB 301 for connecting to memory banks 308A, 308B forming the system main memory or RAM. One or more I/O bus or expansion connectors 232 are also mounted on the PCB 301 for connection to different expansion adapters and options that may 13e added or incorporated into the personal computer system 100. For example, the fixed disk drive 106 is connected to an adapter card 231 which has a small computer system interface (SCSI) disk controller. The adapter card 231 is connected to a I/O bus or expansion connectors 232. Preferably, each connector 232 is a commercially available connector of the type conforming to the above-mentioned MICRO CHANNEL architecture.

Also mounted on the planar board 300 are an interrupt controller 254 and a keyboard/mouse controller 244 which are connected to keyboard and mouse connectors 278, 280, a diskette controller or adapter 246 connected to a diskette connector 282, and serial and parallel adapters 240,238 connected to serial and parallel connectors 276,274 which allow the various I/O devices to be connected into the system. A system power connector 205 is mounted on the PCB 301 for connection to a power unit (not shown) that supplies the necessary power for the system. A nonvolatile memory (NVRAM) 248 and a time-of-day clock/CMOS RAM 250 are also mounted on the PCB 301. The PCB 301 also has mounted thereon various oscillators (not shown) to provide timing signals, and buffers 342, 344 (not all shown) to isolate sections of the circuitry in a manner well known.

The wiring of PCB 301 interconnects the various components as shown in the drawing and is grouped into three groupings, a memory bus 310 (including lines 324-338), a channel bus 312 (including an address bus 322, a data bus 320 and a control bus 318), and miscellaneous signal lines including interrupt lines 314, 316, all of which are connected to counterpart wiring on the PCB 401 through the connectors 302, 416. Tapped off the bus 312 is a planar function bus 319.

Processor Card

Referring to FIG. 4, there is shown the processor card 400 for removably mounting on the planar board 300. The processor card 400 comprises a printed circuit board (PCB) 401 having mounted (e.g., surface mounted) thereon a plurality of commercially available components including a processor 202, an optional math coprocessor 204, an optional cache controller 206, an optional cache memory 208, a direct memory access (DMA) control unit 220, a bus control unit 21 4, a memory control unit 256, a firmware subsystem 242, and parity checking units 402, 404. The processor 202 preferably is a high performance type, such as an Intel 80486, having thirty-two bit data paths and providing thirty-two bit addressing capability. Of course, Intel 80386 and the like processors can be used. The remaining components are selected in conventional fashion for their compatibility with such processor. A plurality of buffers 406, 408, 410, 412, 414 is connected as shown. The buffers provide selective isolation or connection between the circuits allowing different portions to be used concurrently, for example, to move data between the processor 202 and the cache memory 208 while other data is being transferred between an I/O unit and the main memory 308A, 308B. All of the above components are electrically connected to each other as appropriate by printed wiring circuits in PCB 401 which terminate at the edge connector 416. The edge connector 416 is pluggable into the edge connector 302 on the planar board 300 shown in FIG. 3 so that the planar board 300 and the processor card 400 are electrically and mechanically interconnectable. As such, various versions of the processor card 400 each having a processor type associated with it may be plugged into the planar board 300.

The wiring circuits of the PCB 401 include a local bus 418 including data, address and control lines 420, 422, 424, respectively, which interconnect the processor 202 with an optional math coprocessor 204, an optional cache controller 206 and an optional cache memory 208, as shown in FIG. 4. The remaining circuit lines generally include interrupt lines 316, channel bus lines 312 and memory bus lines 310. The channel bus lines 312 include control, data and address bus lines 318, 320, 322, respectively. Memory bus lines 310 include multiplexed memory address lines 324, 332, row address strobe (RAS) lines 328, 336 for memory banks 308A, 308B, column address strobe (CAS) line 338, data bus A and B lines 326 and 334, and a line 330 for use in error checking via parity check or ECC checking. An oscillator 207 is connected as shown for providing suitable clock signals to the computer system 100. For simplicity, certain miscellaneous lines, such as reset, grounds, power-on, etc. have been omitted from FIGS. 2, 3 and 4.

During normal operation of a personal computer system 100 having a board 300 and a card 400, the card 400 is electrically and mechanically connected to the board 300 and typically lies in a plane oriented substantially perpendicularly to the board 400. To reiterate, the system firmware includes the Power-On Self Test program (POST) and the Basic Input Output System program (BIOS). BIOS further includes the compatibility BIOS or CBIOS and advanced BIOS or ABIOS. POST is the set of instructions which execute when the system is first powered-on. The execution of POST is critical to the initialization of the personal computer system 100 when the current system configuration is determined. BIOS is the set of instructions which facilitates the transfer of data and control instructions between the processor 202 and I/O devices.

In case the information processing system (e.g., 102B) are medialess (have no DASD or floppy drive), a Remote Initial Program Load (RIPL) is performed via the communication adapter card 231. The card is connected, for example, to one of the connectors 232 and permits booting an operating system from a network server 102 in a well known manner.

POST contains a bootstrap program which attempts to locate a boot device and load a boot record. Typically, the boot device is hardfile 106 or diskette drive 108 or in case of a media less client the boot device is the server 120. Diskette drive 108 requires a boot or operating system diskette (media, not shown) to operate. If POST is successful in loading a boot record from a boot device, then POST transfers control to the boot record completing the operation of the POST bootstrap program. If a boot record was unable to be loaded and a RPL adapter is present, then POST transfers control to the RPL program. If no RPL program is present, then POST prompts the user indicating that a boot source is required. CBIOS is essential to the bootstrap operation of the computer. CBIOS provides a number of services including access to the hardfile 106 and diskette drive 108.

The information handling system 102, and 102B execute a two stage POST known as initial micro code load (IML) as is well known and is fully described in the U.S. Pat. No. 5,128,995 which is hereby incorporated by reference. According to IML the processor during a stage I POST loads the contents of the firmware subsystem 242 and executes its commands which comprise minimal checking of certain I/O devices, such as display device and certain memory device addresses. Thereafter, during a stage II POST the processor completes the system testing using an IML image. The IML image includes the instructions for completing POST and for turning over processor control to the operating system. During the POST the current system configuration is determined and compared to the pre-determined and pre-stored system configuration information in the NVRAM 248. The IML image is specific to the system processor and is stored in a system partition of the storage device. If the storage device is a diskette in the floppy drive 108 the system partition occupies a portion of the diskette. The IML image stored on the system partition comprises a portion of POST as well as a reference image which contains routines for setting up and/or diagnosing the system hardware. The reference image is loaded and executed when POST detects an error resulting from a configuration change. The reference image may also be loaded in response to a predefined key sequence. If the storage device is the hardfile 106, the system partition is stored at a protected portion of the storage medium in order to avoid inadvertent corruption of the vital IML images. In IBM's model 90 and 95 the protected system partition is stored at the very last portion of the storage medium and occupies a 3 megabyte storage capacity.

According to the present invention the information processing systems 102 and 102B of the information handling network 150 upon detecting a change in system configuration during the IML period activate the communication adaptor card 231 to broadcast certain system configuration information over the network prior to loading the operating system.

Referring to FIG. 5, the operational steps taken for achieving the purpose of the present invention are illustrated by flow chart 500. When the system is powered on, block 501, the information processing system performs POST during the IML period, block 502. The processing system then determines whether the system configuration change is attempted. The change in system configuration may occur by changing hardware configuration, such as increasing or decreasing system memory. Alternatively, the configuration change may be user prompted when the user may request a system configuration change by executing the predefined key stroke sequence. First, the information processing systems, determines whether there has been a hardware configuration change during the IML period through POST, block 503. Such determination is made by comparing the current system configuration with the predetermined system configuration stored in the NVRAM 248. If not, a determination is made as to whether a user initiated configuration change is made, block 504. This determination is made by detecting execution of predefined key sequence by the user in a well known manner. If not, the operating system is loaded, block 505.

However, if POST determines that the hardware configuration of the system is changed, certain system configuration information are collected and communicated over the network prior to loading the operating system, block 506. The system configuration information may include, among other things, error code for one or more of the adapter cards failures, NVRAM, CMOS, and BIOS data area, etc. Thereafter, the reference image is loaded from the system partition and executed to store the current system configuration in the NVRAM 248.

If POST determines that a user initiated system configuration change is attempted, a determination is made as to whether system partition access is permitted, block 507. If not, the system configuration information is collected and communicated over the network, block 508, and subsequently the operating system is loaded, block 509. If, however, system partition access is allowed, a determination is made as to either such access requires authorization from an administrator information processing system, such as the server 102, block 510. If no, the reference image is loaded and executed to allow the user change system configuration. If system partition access require authorization, a system configuration information change request including identification of the system configuration of which is to be changed is communicated to the server 120 through the network communication adapter card 231, block 511. If the server 120 allows permission to access the system partition the reference image is loaded and executed, blocks 512 and 513. If server 102 does not grant permission, the operating system is loaded, blocks 512 and 505.

Figure 6:
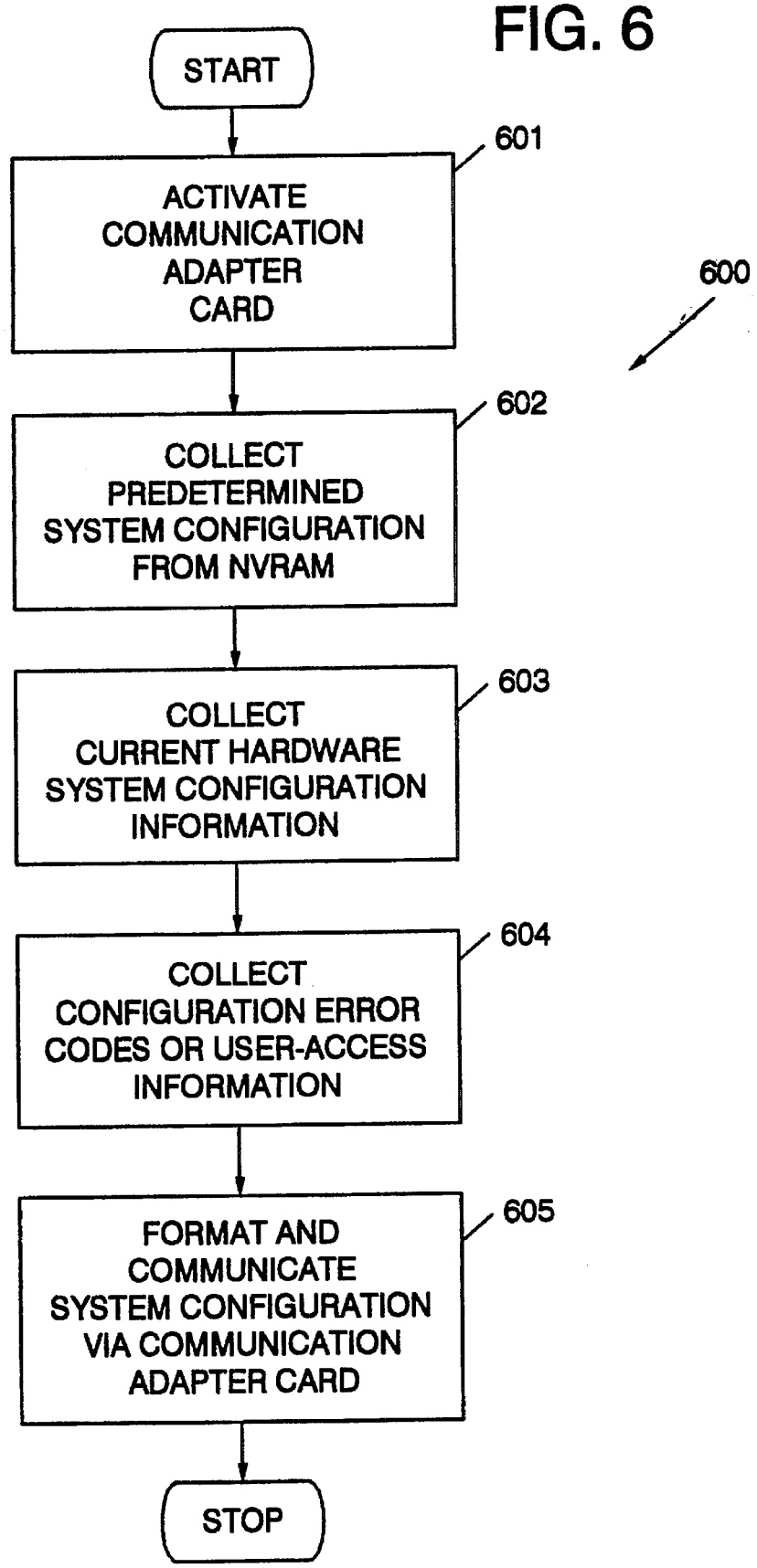
FIG. 6 is a more detailed flow diagram of some of the steps taken in the flow diagram of FIG. 5.

Referring to FIG. 6, a more detailed flow chart 600 of the steps taken during block 506 and 508 are shown. Upon detection of system configuration change (either hardware change or user initiated configuration change), the network communication adapter card 231 is activated, block 601. The information processing system then loads a driver for collecting the predermined system configuration from the NVRAM 248, block 602. The driver then collects the current hardware configuration of the system from the various devices, block 603. Then error related information, i.e, the error code of the hardware configuration change or the user access request information are collected, block 604. All of the collected information from the preceding steps are then formatted and communicated over through the communication adapter card 231 over the network.

The communicated system configuration information is received by the administrator processor system (e.g. the server 102) through the communication adapter card 231. The administrator system includes a monitoring means, preferably in a software routine form, for monitoring the communications on the network 150. Upon detecting the system configuration information, the administrator receives the information and logs it in a permanent storage medium, such as the DASD. The stored information are preferably formatted and time stamped for further processing.

Each information processing system within the system may have the capability of receiving the system configuration information communicated according to the present invention. The information so received by the network systems informs them of the capabilities of the other systems within the network and as such may adapt their hardware to take full advantage of the networks capabilities.

As can be appreciated the present invention offers system configuration information communication capability prior to loading the operating system or any other application software. Thus, making this valuable networking feature available to information handling networks having information processing systems which employ off the shelf operating systems, such as the IBM compatible personal computers. Furthermore, the present invention allows the system configuration information be communicated when necessary upon start up and prior to loading the operating system thus, receiving the processor from performing real time configuration monitoring tasks.

What is claimed is:

1. An information processing system for operating in an information handling network under the control of an operating system loaded into a system memory having a predetermined system configuration, comprising:

detection means for detecting a change in system configuration and determining a new system configuration during an initial microcode load (IML) period prior to loading the operating system into the system memory; and communication means operable prior to loading of the operating system for communicating the new system configuration information over the information handling network upon detecting the change in the system configuration prior to loading the operating system.

2. The processing system of claim 1 further including:

means for allowing or disallowing a user activated change in the system configuration in response to an authorization signal from another processing system.

3. The processing system of claim 1 further including means for receiving the new system configuration information communicated by another processing system over the information handling network.

4. A processing system operating in an information handling network under control of an operating system, comprising:

a central processing unit;

a system memory;

a communication adaptor Operable prior to loading of the operating system for communicating over the information handling network;

storage means for storing a system configuration;

detection means for detecting a change in the system configuration and determining a new system configuration during an initial microcode load (IML) period prior to loading the operating system into the system memory;

collection means for collecting a system configuration information upon detecting the change in the system configuration; and means for activating said communication adaptor prior to loading the operating system for communicating the system configuration information.

5. The processing system of claim 4 wherein said collection means includes means for loading a diagnostic program into the system memory.

6. The processing system of claim 4 further including means for allowing or disallowing user activated change in the system configuration in response to an authorization signal from another processing system.

7. The processing system of claim 4 further including means for receiving the new system configuration as communicated by another processing system over the information handling network.

8. An information handling network, comprising:

a plurality of networked processing systems each operating under control of a corresponding operating system loaded into a system memory each processing system having a system configuration, including:

detection means for detecting a change in system configuration and determining a new system configuration during an IML period prior to loading the corresponding operating system into the system memory;

communication means operable prior to loading of the operating system for communicating the new system configuration information prior to loading the operating system; and at least one administrator processing system including:
  monitor means for monitoring at least a portion of the communications over the information handling network; and
  means for receiving the system configuration information communicated by a processing system upon detecting a change in its system configuration.

9. The information handling network of claim 8, wherein at least one of said processing systems includes means for allowing or disallowing user activated change in the system configuration in response to an authorization signal from the administrator processing system.

10. The information handling network of claim 8, wherein at least one of said processing systems includes means for receiving the new system configuration communicated by another one of the processing systems.

* * * * *